(12) United States Patent
Al-Shafei et al.

(10) Patent No.: US 11,225,612 B2
(45) Date of Patent: *Jan. 18, 2022

(54) CATALYST AND PROCESS FOR CATALYTIC STEAM CRACKING OF HEAVY DISTILLATE

(71) Applicant: SAUDI ARABIAN OIL COMPANY, Dhahran (SA)

(72) Inventors: Emad Naji Al-Shafei, Dhahran (SA); Mohammed Z. Al-Bahar, Dhahran (SA); Ali Nader Al-Jishi, Dhahran (SA); Ki-Hyouk Choi, Dhahran (SA); Mohammad F. Al-Jishi, Dhahran (SA); Ali S. Al-Nasir, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 16/832,519

(22) Filed: Mar. 27, 2020

(65) Prior Publication Data

US 2021/0301212 A1 Sep. 30, 2021

(51) Int. Cl.
*C10G 11/05* (2006.01)
*B01J 21/04* (2006.01)
(Continued)

(52) U.S. Cl.
CPC .............. *C10G 11/05* (2013.01); *B01J 21/04* (2013.01); *B01J 29/40* (2013.01); *B01J 29/7007* (2013.01);
(Continued)

(58) Field of Classification Search
CPC .............. C10G 11/05; C10G 2300/107; C10G 2300/1077; C10G 2300/301;
(Continued)

(56) References Cited

U.S. PATENT DOCUMENTS 3,725,495 A 4/1973 Wrisberg et al.
3,839,485 A 10/1974 Wrisberg
(Continued)

FOREIGN PATENT DOCUMENTS

CN 100537714 C 9/2009
CN 102372555 A * 3/2012
(Continued)

OTHER PUBLICATIONS

Ante Jukic, "Petroleum Refining and Petrochemical Processes, Production of Olefins—Steam Cracking of Hydrocarbons", Faculty of Chemical Engineering and Technology, University of Zagreb, pp. 47.
(Continued)

*Primary Examiner* — Michelle Stein
(74) *Attorney, Agent, or Firm* — Bracewell LLP; Constance G. Rhebergen; Kevin R. Tamm (57) ABSTRACT

Embodiments of the disclosure provide a method for producing light olefins from a hydrocarbon feed. The hydrocarbon feed and a water feed are introduced to a reactor to produce an effluent stream. The reactor is operated at a temperature and pressure such that cracking reactions occur in the reactor. The reactor includes a catalyst bed including a nanoscale zeolite catalyst having a crystal size ranging between 10 nm and 300 nm. The effluent stream includes the light olefins. The effluent stream is introduced to a first separator to produce a gas phase fraction and a liquid phase fraction. The gas phase fraction includes the light olefins. The liquid phase fraction is introduced to a second separator to produce a liquid hydrocarbon stream and a spent water stream.

21 Claims, 1 Drawing Sheet

(51) Int. Cl.
*B01J 29/40* (2006.01)
*B01J 29/70* (2006.01)
*B01J 29/80* (2006.01)
*B01J 29/90* (2006.01)
*B01J 38/12* (2006.01)
*B01J 29/06* (2006.01)

(52) U.S. Cl.
CPC ............. *B01J 29/80* (2013.01); *B01J 29/90* (2013.01); *B01J 38/12* (2013.01); *B01J 2029/062* (2013.01); *C10G 2300/107* (2013.01); *C10G 2300/1077* (2013.01); *C10G 2300/301* (2013.01); *C10G 2300/308* (2013.01); *C10G 2300/4018* (2013.01); *C10G 2400/20* (2013.01)

(58) Field of Classification Search
CPC ...... C10G 2300/308; C10G 2300/4018; C10G 2400/20
See application file for complete search history.

(56) References Cited

U.S. PATENT DOCUMENTS

| | | | |
|---|---|---|---|
| 4,172,816 A | 10/1979 | Pop et al. | |
| 4,980,053 A * | 12/1990 | Li | C10G 11/16 208/120.01 |
| 5,232,579 A | 8/1993 | Absil et al. | |
| 5,833,840 A | 11/1998 | Absil et al. | |
| 7,019,187 B2 | 3/2006 | Powers | |
| 8,673,808 B2 | 3/2014 | Kang et al. | |
| 8,932,456 B2 | 1/2015 | Mello et al. | |
| 9,296,955 B2 | 3/2016 | Strack et al. | |
| 9,328,291 B2 | 5/2016 | Steve | |
| 9,862,898 B2 | 1/2018 | Ward et al. | |
| 10,266,405 B1 | 4/2019 | Srinivas et al. | |
| 2009/0105066 A1 | 4/2009 | Kang et al. | |
| 2009/0325786 A1 | 12/2009 | Liu et al. | |
| 2012/0241358 A1 | 9/2012 | Al-Thubaiti et al. | |
| 2013/0066131 A1 * | 3/2013 | Harris | C07C 4/06 585/653 |
| 2016/0045841 A1 | 2/2016 | Kaplan et al. | |
| 2016/0122667 A1 * | 5/2016 | Evans | C10G 9/36 208/70 |
| 2016/0333280 A1 | 11/2016 | Subramani et al. | |
| 2017/0166819 A1 | 6/2017 | Choi et al. | |
| 2017/0369397 A1 * | 12/2017 | Al-Herz | B01J 35/023 |
| 2018/0237703 A1 | 8/2018 | Akah et al. | |
| 2018/0333708 A1 * | 11/2018 | Ding | C10G 47/20 |

FOREIGN PATENT DOCUMENTS

| | | |
|---|---|---|
| CN | 108264935 A | 7/2018 |
| EP | 0909804 B1 | 9/2010 |
| KR | 100931792 B1 | 12/2009 |
| WO | 2016059565 A2 | 4/2016 |
| WO | 2017222850 A1 | 12/2017 |
| WO | 2018156427 A1 | 8/2018 |

OTHER PUBLICATIONS

Otaraku et al., "Optimization of Hydrogen Production from Nigerian Crude Oil Samples Through Continuous Catalyst Regeneration (CCR) Reforming Process Using Aspen Hysys", American Journal of Applied Chemistry, 2017, pp. 69-72.

Remiro et al., "Steam Reforming of the Bio-Oil Aqueous Fraction in a Fluidized Bed Reactor with in Situ C02 Capture", I&EC research, 2017, pp. 17087-17098, American Chemical Society.

Ren et al., "Olefins from conventional and heavy feedstocks: Energy use in steam cracking and alternative processes", Energy, 2006, pp. 425-451, Elsevier.

International Search Report and Written Opinion of PCT Application No. PCT/US2020/059815 dated Feb. 10, 2021: pp. 1-12.

International Search Report and Written Opinion of PCT Application No. PCT/US2020/059816 dated Feb. 15, 2021: pp. 1-11.

International Search Report and Written Opinion of PCT Application No. PCT/US2021/024479 dated Jul. 9, 2021: pp. 1-11.

Mochizuki et al., "Facile control of crystallite size of ZSM-5 catalyst for cracking of hexane," Microporous and Mesoporous Materials, vol. 145(1), May 10, 2021: pp. 165-171.

Tago et al., "Size-controlled synthesis of nano-zeolites and their application to light olefin synthesis," Catal. Surv. Asia, vol. 16(3), Jul. 15, 2012: pp. 148-163.

* cited by examiner

CATALYST AND PROCESS FOR CATALYTIC STEAM CRACKING OF HEAVY DISTILLATE

BACKGROUND

Field of the Disclosure

Embodiments of the disclosure generally relate to hydrocarbon processing. More specifically, embodiments of the disclosure relate to a method and system for processing hydrocarbons to produce light olefins such as ethylene, propylene, and butenes.

Description of the Related Art

Conventionally, commercial petrochemical plants utilize ethane, liquefied petroleum gas (LPG), or naphtha to produce light olefins. Gasoil, including atmospheric gasoil and vacuum gasoil, is also used as a feedstock for producing light olefins; however, the proportion of gasoil used as a light olefin producing feedstock merely amounts to about 5% worldwide as of 2002. An advantage for using relatively heavier feedstocks such as naphtha or gasoil than ethane or propane is to produce greater yields of propylene, butenes, and aromatics such as benzene, toluene, and xylenes (BTX).

Steam cracking units are typically used for the production of light olefins for such heavier feedstocks; however, the conversion process requires severe cracking temperatures ranging between 750 deg. C. and 900 deg. C. in the absence of a catalyst to achieve meaningful light olefin production.

Fluid catalytic cracking (FCC) units are also used for the production of light olefins for such heavier feedstocks; however, the conversion process requires a relatively high catalyst-to-oil mass ratio ranging between 10 and 40. In addition, the cracking cycle of the FCC unit is typically shorter than that of a non-catalytic steam cracking unit. Such FCC units include high severity FCC (HS-FCC) and deep catalytic cracking (DCC) units, where the olefin yield amounts to 30% to 45%, similar to that of non-catalytic steam cracking units.

SUMMARY

Embodiments of the disclosure generally relate to hydrocarbon processing. More specifically, embodiments of the disclosure relate to a method and system for processing hydrocarbons to produce light olefins such as ethylene, propylene, and butenes.

Embodiments of the disclosure provide a method for producing light olefins from a hydrocarbon feed. The method includes the step of introducing the hydrocarbon feed and a water feed to a reactor to produce an effluent stream. The reactor is operated at a temperature and pressure such that cracking reactions occur in the reactor. The reactor includes a catalyst bed including a nanoscale zeolite catalyst having a crystal size ranging between 10 nm and 300 nm. The reactor is operated at a nanoscale zeolite catalyst-to-oil mass ratio ranging between 0.5 and 5 per cracking cycle. The effluent stream includes the light olefins. The method includes the step of introducing the effluent stream to a first separator to produce a gas phase fraction and a liquid phase fraction. The gas phase fraction includes the light olefins. The method includes the step of introducing the liquid phase fraction to a second separator to produce a liquid hydrocarbon stream and a spent water stream.

In some embodiments, the hydrocarbon feed includes an atmospheric gasoil, a light vacuum gasoil, and combinations of the same. In some embodiments, the nanoscale zeolite catalyst includes a beta (BEA) type, a Zeolite Socony Mobil-5 (ZSM-5) type, and combinations of the same. In some embodiments, the nanoscale zeolite catalyst is a mixture of 90 to 99 wt. % of the BEA type and 1 to 10 wt. % of the ZSM-5 type. The gas phase fraction has an ethylene content ranging between 3 and 7 wt. % and a butenes content ranging between 23 and 30 wt. %. In some embodiments, the nanoscale zeolite catalyst is a mixture of 40 to 60 wt. % of the BEA type and 40 to 60 wt. % of the ZSM-5 type. The gas phase fraction has an ethylene content ranging between 8 and 12 wt. % and a butenes content ranging between 16 and 22 wt. %. In some embodiments, the nanoscale zeolite catalyst is a mixture of 1 to 10 wt. % of the BEA type and 90 to 99 wt. % of the ZSM-5 type. The gas phase fraction has an ethylene content ranging between 13 and 20 wt. % and a butenes content ranging between 10 and 15 wt. %. In some embodiments, the reactor includes silica carbide positioned above and in contact with the catalyst bed. In some embodiments, the nanoscale zeolite catalyst is extruded with an alumina binder. In some embodiments, the alumina binder content of the nanoscale zeolite catalyst ranges between 10 wt. % and 70 wt. %. In some embodiments, the nanoscale zeolite catalyst has a silica-to-alumina mass ratio ranging between 10 and 200. In some embodiments, the nanoscale zeolite catalyst has a mesopore-to-micropore volume ratio ranging between 0.5 and 1.5. In some embodiments, the nanoscale zeolite catalyst has a total acid site concentration ranging between 0.2 mmol/g and 2.5 mmol/g. In some embodiments, the nanoscale zeolite catalyst has a of Brønsted acid site concentration ranging between 0.05 mmol/g and 1.0 mmol/g. In some embodiments, the effluent stream and the gas phase fraction further include hydrogen. In some embodiments, the hydrocarbon feed and the water feed are introduced to the reactor having a water-to-oil mass flow ratio ranging between 2 and 6 at standard ambient temperature and pressure (SATP). In some embodiments, the reactor is operated at a temperature ranging between 590 deg. C. and 650 deg. C. In some embodiments, the hydrocarbon feed is introduced to the reactor at a space velocity ranging between 0.25 inverse hours ($h^{-1}$) and 5 $h^{-1}$. In some embodiments, the water feed is introduced to the reactor at a space velocity ranging between 0.5 $h^{-1}$ and 20 $h^{-1}$.

In some embodiments, the method further includes the step of regenerating the nanoscale zeolite catalyst. The regenerating step includes the step of evacuating internal fluids of the reactor. The regenerating step includes the step of introducing a regeneration gas to the reactor while maintaining the reactor at a temperature ranging between 650 deg. C. and 750 deg. C. In some embodiments, the regeneration gas includes oxygen. In some embodiments, the regeneration gas is introduced to the reactor for a duration ranging between 15 minutes and 30 minutes. In some embodiments, the regenerating step is continued until the regeneration gas exiting the reactor has a carbon dioxide content less than 0.05 wt. %.

BRIEF DESCRIPTION OF THE DRAWINGS

So that the manner in which the previously-recited features, aspects, and advantages of the embodiments of this disclosure as well as others that will become apparent are attained and can be understood in detail, a more particular description of the disclosure briefly summarized previously may be had by reference to the embodiments that are illustrated in the drawings that form a part of this specification. However, it is to be noted that the appended drawings illustrate only certain embodiments of the disclosure and are not to be considered limiting of the disclosure's scope as the disclosure may admit to other equally effective embodiments.

In the accompanying FIGURE, similar components or features, or both, may have a similar reference label.

DETAILED DESCRIPTION

Figure 1:
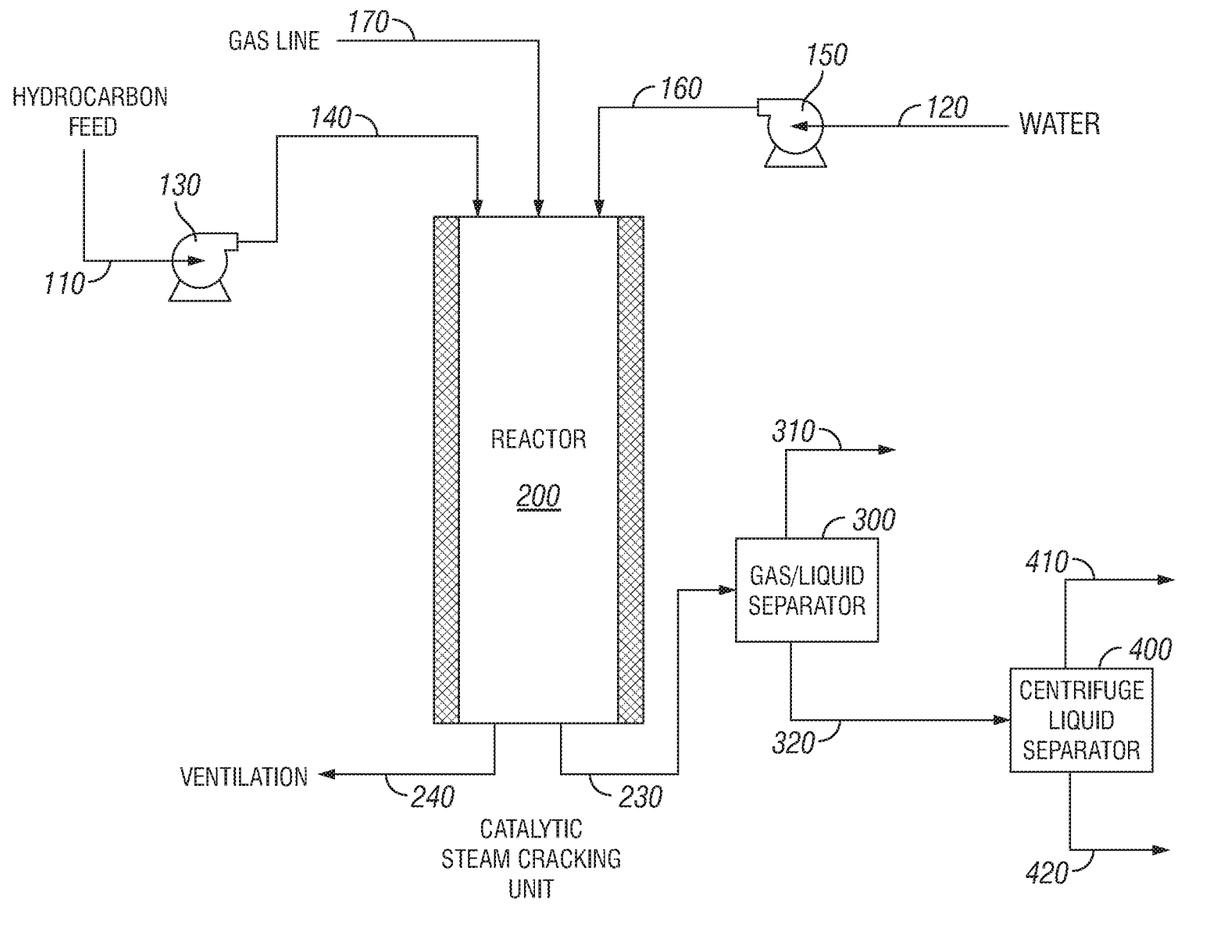
FIGURE is a schematic diagram of a catalytic steam cracking process for producing light olefins according to an embodiment of the disclosure.

The disclosure refers to particular features, including process or method steps and systems. Those of skill in the art understand that the disclosure is not limited to or by the description of embodiments given in the specification. The subject matter of this disclosure is not restricted except only in the spirit of the specification and appended claims.

Those of skill in the art also understand that the terminology used for describing particular embodiments does not limit the scope or breadth of the embodiments of the disclosure. In interpreting the specification and appended claims, all terms should be interpreted in the broadest possible manner consistent with the context of each term. All technical and scientific terms used in the specification and appended claims have the same meaning as commonly understood by one of ordinary skill in the art to which this disclosure belongs unless defined otherwise.

Although the disclosure has been described with respect to certain features, it should be understood that the features and embodiments of the features can be combined with other features and embodiments of those features.

Although the disclosure has been described in detail, it should be understood that various changes, substitutions, and alternations can be made without departing from the principle and scope of the disclosure. Accordingly, the scope of the present disclosure should be determined by the following claims and their appropriate legal equivalents.

As used throughout the disclosure, the singular forms "a," "an," and "the" include plural references unless the context clearly indicates otherwise.

As used throughout the disclosure, the word "about" includes +/−5% of the cited magnitude. The word "substantially" includes +/−5% of the cited magnitude.

As used throughout the disclosure, the words "comprise," "has," "includes," and all other grammatical variations are each intended to have an open, non-limiting meaning that does not exclude additional elements, components or steps. Embodiments of the present disclosure may suitably "comprise," "consist," or "consist essentially of" the limiting features disclosed, and may be practiced in the absence of a limiting feature not disclosed. For example, it can be recognized by those skilled in the art that certain steps can be combined into a single step.

As used throughout the disclosure, the words "optional" or "optionally" means that the subsequently described event or circumstances can or may not occur. The description includes instances where the event or circumstance occurs and instances where it does not occur.

Where a range of values is provided in the specification or in the appended claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended claims to a method comprising two or more defined steps, the defined steps can be carried out in any order or simultaneously except where the context excludes that possibility.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

As used throughout the disclosure, spatial terms described the relative position of an object or a group of objects relative to another object or group of objects. The spatial relationships apply along vertical and horizontal axes. Orientation and relational words such are for descriptive convenience and are not limiting unless otherwise indicated.

As used throughout the disclosure, "external supply of hydrogen" refers to the addition of hydrogen to the feed to the reactor or to the reactor itself. For example, a reactor in the absence of an external supply of hydrogen means that the feed to the reactor and the reactor are in the absence of added hydrogen, gas ($H_2$) or liquid, such that no hydrogen (in the form $H_2$) is a feed or a part of a feed to the reactor.

As used throughout the disclosure, "crude oil" refers to petroleum hydrocarbon streams that can include whole range crude oil, reduced crude oil, and refinery streams. "Whole range crude oil" refers to passivated crude oil which has been processed by a gas-oil separation plant after being recovered from a production well. "Reduced crude oil" can also be known as "topped crude oil" and refers to a crude oil having no light fraction, and would include an atmospheric residue stream or a vacuum residue stream. Refinery streams can include "cracked oil," such as light cycle oil, heavy cycle oil, and streams from a fluid catalytic cracking unit (FCC), such as slurry oil or decant oil, a heavy stream from hydrocracker with a boiling point greater than 343 deg. C., a deasphalted oil (DAO) stream from a solvent extraction process, and a mixture of atmospheric residue and hydrocracker bottom fractions.

As used throughout the disclosure, "atmospheric gasoil" refers to the fraction of oil-containing streams having a TBP 5% of about 315 deg. C. and a TBP 95% of about 370 deg. C., such that about 90% of the hydrocarbons have boiling points between about 315 deg. C. and about 370 deg. C. Atmospheric gasoil can refer to the composition of an entire stream, such as when the feedstock is from an atmospheric distillation unit, or can refer to a fraction of a stream, such as when a whole range crude oil is used.

As used throughout the disclosure, "light vacuum gasoil" refers to the fraction of oil-containing streams having a TBP 5% of about 370 deg. C. and a TBP 95% of 430 deg. C., such that about 90% of the hydrocarbons have boiling points between 370 deg. C. and 430 deg. C. Light vacuum gasoil can refer to the composition of an entire stream, such as when the feedstock is from a vacuum distillation unit, or can refer to a fraction of a stream, such as when a whole range crude oil is used.

As used throughout the disclosure, "heavy vacuum gasoil" refers to the fraction of oil-containing streams having a TBP 5% of 470 deg. C. and a TBP 95% of 580 deg. C., such that about 90% of the hydrocarbons have boiling points between 470 deg. C. and 580 deg. C. Heavy vacuum gasoil can refer to the composition of an entire stream, such as when the feedstock is from a vacuum distillation unit, or can refer to a fraction of a stream, such as when a whole range crude oil is used.

As used throughout the disclosure, "asphaltene" refers to the fraction of an oil-containing stream which is not soluble in a n-alkane, particularly, n-heptane (a C7 n-alkane).

As used throughout the disclosure, "light olefin" refers to ethylene, propylene, n-butene, iso-butene, cis-2-butene, trans-2-butene, 1,3-butadiene, and combinations of the same. Each of ethylene, propylene, n-butene, iso-butene, cis-2-butene, trans-2-butene, and 1,3-butadiene is a light olefin and together they are light olefins.

As used throughout the disclosure, "distillate" refers to the hydrocarbon fraction lighter than the distillation residue from an atmospheric distillation process or a vacuum distillation process.

As used throughout the disclosure, "coke" refers to the toluene insoluble material present in petroleum.

As used throughout the disclosure, "cracking" refers to the breaking of hydrocarbons into smaller ones containing few carbon atoms due to the breaking of carbon-carbon bonds.

As used throughout the disclosure, "upgrade" means one or all of increasing API gravity, decreasing the amount of impurities, such as sulfur, nitrogen, and metals, decreasing the amount of asphaltene, and increasing the amount of distillate in a process outlet stream relative to the process feed stream. One of skill in the art understands that upgrade can have a relative meaning such that a stream can be upgraded in comparison to another stream, but can still contain undesirable components such as impurities.

As used throughout the disclosure, "conversion reactions" refers to reactions that can upgrade a hydrocarbon stream including cracking, isomerization, alkylation, dimerization, aromatization, cyclization, desulfurization, denitrogenation, deasphalting, and demetallization.

As used throughout the disclosure, "non-catalytic steam cracking" refers to a process where thermal cracking reactions occur in the presence of steam. Steam cracking can include a furnace. The furnace can include a convection section and a radiation section. The convection section can be used for preheating a feedstock stream, a water stream, and other streams. The convection section can operate at a temperature at or greater than about 650 deg. C. The convection section can operate at a pressure between about 0.2 megapascals (MPa) and about 0.5 MPa. Steam can be injected with the hydrocarbon stream in the convection section. Vaporization of the feed to a steam cracking process can increase light olefin production. Without being bound by any theory, vapor-phase cracking of hydrocarbons in the convection section can lead to formation of light molecules, such as $C_2$ and $C_3$ compounds, while liquid-phase cracking can lead to middle range molecules, such as $C_7$ and $C_8$ compounds. Operating conditions to increase vaporization are maintained to avoid the conversion to coke due to non-vaporized hydrocarbons. Steam, as a diluent, can suppress coke formation. After passing through the convection section, the stream can enter the radiation section where thermal cracking can occur. The radiation section can operate at a temperature between about 750 deg. C. and about 850 deg. C. The radiation section can operate at a pressure between about 0.2 MPa and about 0.5 MPa. The radiation section can be used for severe cracking of hydrocarbons to produce light olefins.

FIGURE shows a schematic diagram of a catalytic steam cracking process 100 for producing light olefins. The process 100 can include a pumps 130, 150, a reactor 200, and separators 300, 400.

A hydrocarbon feed 110 is introduced to the process 100. The hydrocarbon feed 110 can be obtained from any heavy oil source derived from petroleum, coal liquid, or biomaterials. Non-limiting examples of the hydrocarbon feed 110 can include whole range crude oil, distilled crude oil, residue oil, atmospheric residue, vacuum residue, atmospheric gasoil, light vacuum gasoil, heavy vacuum gasoil, deasphalted oil, topped crude oil, refinery streams, product streams from steam cracking processes, liquefied coals, liquid products recovered from oil or tar sands, bitumen, oil shale, asphaltene, liquid hydrocarbons recovered from gas-to-liquid (GTL) processes, and biomass derived hydrocarbons. In at least one embodiment, the hydrocarbon feed 110 can include an atmospheric gasoil fraction or a light vacuum gasoil fraction, or both. "Whole range crude oil" refers to passivated crude oil which has been processed by a gas-oil separation plant after being recovered from a production well. "Topped crude oil" can also be known as "reduced crude oil" and refers to a crude oil having no light fraction, and would include an atmospheric residue stream or a vacuum residue stream. "Refinery streams" can include "cracked oil," such as light cycle oil, heavy cycle oil, and streams from a fluid catalytic cracking unit (FCC), such as slurry oil or decant oil, a heavy stream from hydrocracker with a boiling point greater than 340 deg. C., a deasphalted oil (DAO) stream from a solvent extraction process, and a mixture of atmospheric residue and hydrocracker bottom fractions.

In some embodiments, the hydrocarbon feed 110 can include a mixture of an atmospheric gasoil (AGO) fraction and a light vacuum gasoil (LVGO) fraction. The mixture can have an AGO-to-LVGO mass ratio ranging between about 0.1 and about 10.

Optionally, the hydrocarbon feed 110 can be preheated using a heat exchanger (not shown) to a temperature ranging between about 40 deg. C. and about 100 deg. C. The heat exchanger can be any type of heat exchanger capable of increasing the temperature of the hydrocarbon feed 110. Non-limiting examples of the heat exchanger can include an electric heater, a fired heater, and a cross exchanger.

The hydrocarbon feed 110 is passed to the pump 130 to produce a hydrocarbon stream 140. The pump 130 can be any type of pump capable of control the flow rate of the hydrocarbon feed 110. In at least one embodiment, the pump 130 is a diaphragm metering pump. The flow rate of the hydrocarbon stream 140 is controlled via the pump 130 such that components of the hydrocarbon stream 140 are introduced at a space velocity ranging between about $0.1\ h^{-1}$ and about $100\ h^{-1}$, alternately between about $0.1\ h^{-1}$ and about $50\ h^{-1}$, alternately between about $0.25\ h^{-1}$ and about $20\ h^{-1}$, or alternately between about $0.25\ h^{-1}$ and about $5\ h^{-1}$. In at least one embodiment, components of the hydrocarbon stream 140 are introduced at a space velocity of about $1\ h^{-1}$.

Optionally, the hydrocarbon stream 140 can be heated using a heat exchanger (not shown) to a temperature ranging between about 50 deg. C. and about 250 deg. C. or alternately between about 150 deg. C. and about 250 deg. C. In at least one embodiment, the hydrocarbon stream 140 is heated to a temperature of about 100 deg. C. The heat exchanger can be any type of heat exchanger capable of increasing the temperature of the hydrocarbon stream 140. Non-limiting examples of the heat exchanger can include an electric heater, a fired heater, and a cross exchanger.

A water feed 120 is introduced to the process 100. The water feed 120 can include deionized water. The water feed 120 can have a conductivity less than about 1.0 microSiemens per centimeter (0/cm), alternately less than about 0.5 µS/cm, or alternately less than about 0.1 µS/cm. In at least one embodiment, the water feed 120 has a conductivity less than about 0.1 µS/cm. The water feed 120 can have a sodium content less than about 10 µg/L, alternately less than about 5 µg/L, or alternately less than about 1 µg/L. In at least one embodiment, the water feed 120 has a sodium content less than about 1 µg/L. The water feed 120 can have a chloride content less than about 5 µg/L, alternately less than about 3 µg/L, or alternately less than about 1 µg/L. In at least one embodiment, the water feed 120 has a chloride content less than about 1 µg/L. The water feed 120 can have a silica content less than about 5 µg/L, alternately less than about 4 µg/L, or alternately less than about 3 µg/L. In at least one embodiment, the water feed 120 has a silica content less than about 3 µg/L.

Optionally, the water feed 120 can be preheated using a heat exchanger (not shown) to a temperature ranging between about 40 deg. C. and about 100 deg. C. The heat exchanger can be any type of heat exchanger capable of increasing the temperature of the water feed 120. Non-limiting examples of the heat exchanger can include an electric heater, a fired heater, and a cross exchanger.

The water feed 120 is passed to the pump 150 to produce a water stream 160. The pump 150 can be any type of pump capable of control the flow rate of the water feed 120. In at least one embodiment, the pump 150 is a diaphragm metering pump. The flow rate of the water stream 160 is controlled via the pump 150 such that components of the water stream 160 are introduced at a space velocity ranging between about 0.1 h$^{-1}$ and about 100 h$^{-1}$ or alternately between about 0.5 h$^{-1}$ and about 20 h$^{-1}$. In at least one embodiment, components of the water stream 160 are introduced at a space velocity of about 4 h$^{-1}$. The space velocity of the water stream 160 is greater than that of the hydrocarbon stream 140 to increase the impact of steam and the conversion rate during catalytic steam cracking in the reactor 200. In some embodiments, the space velocity of the water stream 160 is about twice to about ten times greater than that of the hydrocarbon stream 140.

Optionally, the water stream 160 can be heated using a heat exchanger (not shown) to a temperature ranging between about 40 deg. C. and about 100 deg. C. or alternately between about 50 deg. C. and about 75 deg. C. In at least one embodiment, the water stream 160 is heated to a temperature of equal to or greater than about 90 deg. C. The heat exchanger can be any type of heat exchanger capable of increasing the temperature of the water stream 160. Non-limiting examples of the heat exchanger can include an electric heater, a fired heater, and a cross exchanger.

The hydrocarbon stream 140 and the water stream 160 are introduced to the reactor 200. In some embodiments, the hydrocarbon stream 140 and the water stream 160 can be premixed before being introduced to the reactor 200 using any type of mixing device capable of mixing the hydrocarbon stream 140 and the water stream 160, such as a tee junction, a static mixer, an inline mixer, and impeller-embedded mixer. In other embodiments, the hydrocarbon stream 140 and the water stream 160 are separately introduced to the reactor 200. The hydrocarbon stream 140 and the water stream 160 are introduced to the reactor 200 having a water-to-oil mass flow ratio ranging between about 0.1 and about 20 at SATP, alternately between about 1 and about 10 at SATP, or alternately between about 2 and about 6 at SATP. In at least one embodiment, the water-to-oil volume ratio is about 4 at SATP.

During a cracking cycle, the reactor 200 is maintained at a temperature ranging between about 400 deg. C. and about 800 deg. C., alternately between about 575 deg. C. and about 675 deg. C., or alternately between about 590 deg. C. and about 650 deg. C. In at least one embodiment, the reactor 200 is maintained at a temperature of about 600 deg. C. Means for maintaining such temperature of the reactor 200 can include a strip heater, immersion heater, tubular furnace, heat exchanger, or like devices known in the art. The reactor 200 can be maintained at a pressure ranging between about 0.01 MPa and about 1 MPa or alternately between about 0.05 MPa and about 0.5 MPa. In at least one embodiment, the reactor 200 is maintained at a pressure of about 0.1 MPa. The reactor 200 can be a tubular type reactor, a vessel type reactor, a continuous stirred-tank reactor (CSTR), and combinations of the same. In at least one embodiment, the reactor 200 is a vessel type reactor. The residence time in the reactor 200 can range between about 0.5 hours and about 10 hours, alternately between about 1 hours and about 8 hours, or alternately between about 2 hours and about 6 hours. The residence time is calculated by assuming that the densities of the reactants in the reactor 200 are similar to that of water at operating conditions of the reactor 200. In at least one embodiment, the reactor 200 is in the absence of an external supply of hydrogen. The product of the reactor 200 is collected via an effluent stream 230.

The reactor 200 includes a nanoscale zeolite catalyst. The nanoscale zeolite catalyst can be placed in the reactor in the form of a fixed catalyst bed. Optionally, a catalyst diluent such as silica carbide can be placed above and in contact with the catalyst bed to ensure proper heat transfer to the injected hydrocarbons prior to catalytic steam cracking. Non-limiting examples of the nanoscale zeolite catalyst include a BEA type, a ZSM-5 type, and combinations of the same. The nanoscale zeolite catalyst has a crystal size ranging between about 10 nanometers (nm) and about 600 nm or alternately between about 10 nm and about 300 nm. In some embodiments, the nanoscale zeolite catalyst can be in the form of an extrudate where the nanoscale zeolite catalyst is extruded with an alumina binder. The alumina binder content can range between about 10 wt. % and about 70 wt. %. In some embodiments, the nanoscale zeolite catalyst can have a silica-to-alumina mass ratio ranging between about 10 and about 200.

In some embodiments, the reactor 200 is operated such that the nanoscale zeolite catalyst-to-oil mass ratio ranges between about 0.5 and about 20, alternately between about 0.5 and about 10, or alternately between about 0.5 and about 5 per a single cracking cycle. The weight of the nanoscale zeolite catalyst includes the weight of the alumina binder. For comparison, a typical FCC unit has a catalyst-to-oil mass ratio ranging between 10 and 40. Advantageously, embodiments of the disclosure provide a catalytic steam cracking process that employs a reduced quantity of catalyst than a conventional FCC process while producing sufficient quantities of light olefins.

In some embodiments, the nanoscale zeolite catalyst can include a mixture of the nanoscale BEA type zeolite and the nanoscale ZSM-5 type zeolite. The mixture can have a BEA-to-ZSM-5 mass ratio ranging between about 0.2 and about 5 or alternately between about 0.3 and about 3. Without being bound by any theory, a greater BEA-to-ZSM-5 mass ratio results in a greater yield of propylene, butenes, and hydrogen. Conversely, without being bound by any theory, a lesser BEA-to-ZSM-5 mass ratio results in a greater yield of propylene and ethylene, and a lesser yield of hydrogen.

The nanoscale zeolite catalyst can be synthesized and crystallized from colloidal silica using tetraethylammonium hydroxide (TEAOH) as an organic structure-directing agent (OSDA) to guide the formation of particular types of pore and channels during zeolite synthesis. The colloidal silica can have a silica content ranging between about 20 wt. % and about 40 wt. % in water. The concentration of TEAOH can range between about 30 wt. % and about 40 wt. % in water. The nanoscale zeolite catalyst can include mesopores and micropores. As used throughout the disclosure, the term "mesopore" refers to a pore having a dimension ranging between about 2 nm and about 50 nm. As used throughout the disclosure, the term "micropore" refers to a pore having a dimension less than about 2 nm. The nanoscale zeolite catalyst can have a mesopore-to-micropore volume ratio ranging between about 0.5 and about 1.5.

The nanoscale zeolite catalyst can exist in its acidic, hydrogenated form. The total concentration of acid sites for the nanoscale zeolite catalyst can range between about 0.2 millimoles per gram (mmol/g) and about 2.5 mmol/g. In some embodiments, the concentration of Brønsted acid sites for the nanoscale zeolite catalyst can range between about 0.1 mmol/g and about 1.0 mmol/g.

The effluent stream 230 includes gaseous hydrocarbons, liquid hydrocarbons, and water. Non-limiting examples of gaseous hydrocarbons include light olefins, hydrogen, methane, ethane, propane, n-butane, and iso-butane. Non-limiting examples of liquid hydrocarbons include upgraded hydrocarbons.

Optionally, the effluent stream 230 can be cooled using a heat exchanger (not shown) to a temperature ranging between about 0 deg. C. and about 50 deg. C. The heat exchanger can be any type of heat exchange device capable of reducing the temperature of the effluent stream 230. Non-limiting examples of the heat exchanger can include an air cooler, a double pipe type exchanger, and shell-and-tube type exchanger.

The effluent stream 230 is introduced to the separator 300. The separator 300 separates the effluent stream 230 into a gas phase stream 310 and a liquid phase stream 320. The separator 300 can be any gas-liquid separator capable of separating a fluid stream into a liquid stream and a gas stream. The temperature of separator 300 can be adjusted to achieve the desired separation between the gas phase stream 310 and the liquid phase stream 320. The separator 300 can include an external or internal cooling element (not shown) to reduce the temperature of the internal fluid. The separator 300 is operated at a temperature less than about 25 deg. C. or alternately less than about 15 deg. C. to ensure hydrocarbons having a carbon number equal to or greater than five are liquefied and included in the liquid phase stream 320. The liquid phase stream 320 also includes water. Resultantly, the gas phase stream 310 includes hydrocarbons having a carbon number equal to or less than four. Components of the gas phase stream 310 can be further purified and treated via an external gas separation unit (not shown) known in the art.

In some embodiments, the gas phase stream 310 can have a propylene-to-ethylene (C3 to C2 olefin) mass ratio ranging between about 2 and about 5. In some embodiments, the gas phase stream 310 can have a propylene-to-butenes (C3 to C4 olefin) mass ratio ranging between about 0.5 and about 3. In some embodiments, the gas phase stream 310 can have a (propylene+butenes)-to-ethylene (C3+C4 to C2 olefin) mass ratio ranging between about 2 and about 10. In some embodiments, the total olefin yield can range between about 20 wt. % and about 90 wt., alternately between about 40 wt. % and about 70 wt. %, or alternately between about 50 wt. % and about 55 wt. %. In some embodiments, the gas phase stream 310 can have a hydrogen gas content ranging between about 6 wt. % and about 25 wt. %.

In some embodiments, the nanoscale zeolite catalyst can include a mixture of about 90-99 wt. % BEA type zeolite and about 1-10 wt. % ZSM-5 type zeolite before finding with alumina. The resulting gas phase stream 310 can have an ethylene content ranging between about 3 and about 7 wt. % and a butenes content ranging between about 23 and about 30 wt. %. The gas phase stream 310 can have a C3 to C2 olefin mass ratio ranging between about 3.5 and about 5. The gas phase stream 310 can have a C3 to C4 olefin mass ratio ranging between about 0.5 and about 1. The gas phase stream 310 can have a C3+C4 to C2 olefin mass ratio ranging between about 6 and about 10. The gas phase stream 310 can have a hydrogen content ranging between about 4 and about 8 wt. %.

In some embodiments, the nanoscale zeolite catalyst can include a mixture of about 40-60 wt. % BEA type zeolite and about 40-60 wt. % ZSM-5 type zeolite before finding with alumina. The resulting gas phase stream 310 can have an ethylene content ranging between about 8 and about 12 wt. % and a butenes content ranging between about 16 and about 22 wt. %. The gas phase stream 310 can have a C3 to C2 olefin mass ratio ranging between about 2.2 and about 3.4. The gas phase stream 310 can have a C3 to C4 olefin mass ratio ranging between about 1.1 and about 2. The gas phase stream 310 can have a C3+C4 to C2 olefin mass ratio ranging between about 4.5 and about 5.9. The gas phase stream 310 can have a hydrogen content ranging between about 9 and about 14 wt. %.

In some embodiments, the nanoscale zeolite catalyst can include a mixture of about 1-10 wt. % BEA type zeolite and about 90-99 wt. % ZSM-5 type zeolite before finding with alumina. The resulting gas phase stream 310 can have an ethylene content ranging between about 13 and about 20 wt. % and a butenes content ranging between about 10 and about 15 wt. %. The gas phase stream 310 can have a C3 to C2 olefin mass ratio ranging between about 1 and about 2.1. The gas phase stream 310 can have a C3 to C4 olefin mass ratio ranging between about 2.1 and about 3. The gas phase stream 310 can have a C3+C4 to C2 olefin mass ratio ranging between about 2 and about 4.4. The gas phase stream 310 can have a hydrogen content ranging between about 15 and about 22 wt. %.

The liquid phase stream 320 is introduced to the separator 400. The separator 400 separates the liquid phase stream 320 into a liquid hydrocarbon stream 410 and a spent water stream 420. The separator 400 can be any oil-water separator capable of separating a fluid stream into an oil stream and a water stream. In at least one embodiment, the separator 400 is an inline centrifuge unit. The inline centrifuge unit can be operated at a speed ranging between about 2,500 revolutions per minute (rpm) and about 5,000 rpm. The liquid hydrocarbon stream can include upgraded hydrocarbons such as naphtha, kerosene, diesel, and unconverted fractions.

During a regeneration cycle, the internal fluids present in the reactor 200 during the cracking cycle are evacuated. Optionally, a purge gas such as nitrogen gas can be introduced to the reactor 200 for fluid evacuation via a gas line 170. The purge gas can be continuously introduced to the reactor 200 at a space velocity ranging between about 10 h$^{-1}$ and about 100 h$^{-1}$. The purge gas continuously exits the reactor 200 via a ventilation line 240.

Once fluid evacuation is completed, a regeneration gas is introduced to the reactor 200 via the gas line 170. The regenerating gas can be any oxygen-containing gas suitable for regenerating the nanoscale zeolite catalyst. Non-limiting example gases suitable for use as the regeneration gas include air, oxygen-enriched air, pure oxygen, and combinations of the same. In at least one embodiment, the regeneration gas includes air.

Optionally, the regeneration gas can be preheated using a heat exchanger (not shown) to a temperature at which regeneration occurs in the reactor 200. The heat exchanger can be any type of heat exchanger capable of increasing the temperature of the regeneration gas. Non-limiting examples of the heat exchanger can include an electric heater, a fired heater, and a cross exchanger.

During the regeneration cycle, the regeneration gas is continuously introduced to the reactor 200 via the gas line 170 at a space velocity ranging between about 10 h$^{-1}$ and about 100 h$^{-1}$. The regeneration gas continuously exits the reactor 200 via the ventilation line 240. The operating temperature of the reactor 200 during the regeneration cycle is greater than that during the cracking cycle. In at least one embodiment, the reactor 200 is maintained at a temperature ranging between about 650 deg. C. and about 750 deg. C. during the regeneration cycle. The duration of the regeneration cycle can range between about 3 hours and about 5 hours.

In some embodiments, an inline gas analyzer (not shown) is placed in the ventilation line 240. The inline gas analyzer can be any gas analyzer capable of determining the carbon dioxide content of the exiting regeneration gas. Carbon dioxide can be formed from decoking, which is an indicator of the degree of catalyst regeneration. As the regeneration cycle progresses, the carbon dioxide content of the exiting air flow reduces to a point less than about 0.1 wt. % or alternately less than about 0.05 wt. %. Once the carbon dioxide content is reduced to such point, the regeneration gas is no longer introduced to the reactor 200. A purge gas such as nitrogen gas is continuously introduced to the reactor 200 via the gas line 170 for a duration ranging between 15 minutes and about 30 minutes. The purge gas continuously exits the reactor 200 via the ventilation line 240. While purging, the temperature of the reactor 200 is reduced to the operating temperature during the cracking cycle. In at least one embodiment, the temperature of the reactor 200 is reduced and maintained at about 600 deg. C. Once purging is complete, the gas line 170 and the ventilation line 240 are closed and another cracking cycle can be conducted.

EXAMPLES

The disclosure is illustrated by the following examples, which are presented for illustrative purposes only, and are not intended as limiting the scope of the invention which is defined by the appended claims.

Example 1

The nanoscale zeolite catalyst was synthesized according to the following procedure. About 0.640 grams of aluminum sulfate octahydrate (selected as an aluminum source) was dissolved in about 37.0 grams of deionized water by stirring. About 15.6 grams of about 1 M aqueous tetrapropylammonium hydroxide (TPAOH, selected as the OSDA) was added to the mixture and stirred vigorously for about 5 minutes. Subsequently, about 10 grams of tetraethyl orthosilicate (TEOS, selected as a silica source) was added to the mixture and stirred for about 90 minutes allowing silica to be hydrolyzed until a clear solution was observed. The resulting mixture was transferred to a PTFE line stainless steel autoclave then placed in an oven for about 48 hours at about 180 deg. C. The mixture underwent centrifugation to separate the synthesized nanoscale zeolite catalyst (including the OSDA), where the zeolite catalyst was further filtrated and washed with deionized water, then dried in an oven at about 100 deg. C. to obtain the zeolite catalyst in powdered form. The powdered zeolite catalyst was further calcined at about 550 deg. C. in air to remove the OSDA. About 10 grams of the zeolite catalyst were combined with about 100 grams of about 1 M aqueous ammonium nitrate to exchange existing cations with ammonium. The zeolite catalyst was further dried in an oven at about 100 deg. C. then calcined at about 550 deg. C. in air to produce an acidic, hydrogenated form of the zeolite catalyst. The final nanoscale zeolite catalyst was an extruded ZSM-5 type zeolite with about 40 wt. % alumina binder. The final nanoscale zeolite catalyst had a crystal size ranging between about 10 nm and about 300 nm.

Example 2

A catalytic steam cracking experiment was conducted. The process had a configuration similar to FIGURE.

A hydrocarbon feed was introduced to the respective process having a temperature of about 100 deg. C. and a space velocity of about 1 h$^{-1}$. The hydrocarbon feed was an atmospheric gasoil obtained from a crude distillation unit. The hydrocarbon feed had a composition as shown in Table 1.

TABLE 1

| API Gravity | 27.9 |
|---|---|
| Density (g/cm$^3$) | 0.888 |
| Distillation Properties (deg. C.) | |
| TBP 0% | 279.2 |
| TBP 5% | 292.4 |
| TBP 10% | 298.2 |
| TBP 20% | 305.9 |
| TBP 30% | 312.3 |
| TBP 40% | 318.1 |
| TBP 50% | 324.6 |
| TBP 60% | 329.8 |
| TBP 70% | 336.8 |
| TBP 80% | 343.2 |
| TBP 90% | 358.5 |
| TBP 95% | 383.4 |
| TBP 100% | 475.7 |

A water feed was introduced to the respective process having a temperature equal to or greater than about 90 deg. C. and a space velocity of about 4 h$^{-1}$.

The catalytic steam cracking was conducted in a fixed bed reactor including the nanoscale zeolite catalyst. The nanoscale zeolite catalyst was an extruded BEA type zeolite with a 40 wt. % alumina binder. The nanoscale zeolite catalyst had a crystal size ranging between about 10 nm and about 300 nm. The reactor was operated at a temperature of about 600 deg. C. and a pressure of about 0.1 MPa for about 2.5 hours.

The upgraded hydrocarbon product had a composition as shown in Table 2. The conversion rate was about 95%. The C3 to C2 olefin mass ratio was about 4.4. The C3 to C4 olefin mass ratio was about 1.1. The C3+C4 to C2 olefin mass ratio was about 8.5.

TABLE 2

| Product | Distribution (wt. %) |
|---|---|
| Light Distillates (C5 or higher) | 6.8 |
| Total Olefins | 51.7 |
| Ethylene | 5.4 |
| Propylene | 24.0 |
| Butenes | 22.3 |
| Hydrogen | 12 |

Example 3

A catalytic steam cracking experiment was conducted. The process had a configuration similar to FIGURE.

A hydrocarbon feed was introduced to the respective process having a temperature of about 100 deg. C. and a space velocity of about 1 $h^{-1}$. The hydrocarbon feed was an atmospheric gasoil obtained from a crude distillation unit. The hydrocarbon feed had a composition as shown in Table 1.

A water feed was introduced to the respective process having a temperature equal to or greater than about 90 deg. C. and a space velocity of about 3 $h^{-1}$.

The catalytic steam cracking was conducted in a fixed bed reactor including the nanoscale zeolite catalyst. The nanoscale zeolite catalyst was an extruded ZSM-5 type zeolite with a 40 wt. % alumina binder. The nanoscale zeolite catalyst had a crystal size ranging between about 10 nm and about 300 nm. The reactor was operated at a temperature of about 600 deg. C. and a pressure of about 0.1 MPa for about 2.5 hours.

The upgraded hydrocarbon product had a composition as shown in Table 3. The conversion rate was about 82%. The C3 to C2 olefin mass ratio was about 1.9. The C3 to C4 olefin mass ratio was about 2.3. The C3+C4 to C2 olefin mass ratio was about 2.8.

TABLE 3

| Product | Distribution (wt. %) |
|---|---|
| Light Distillates (C5 or higher) | 7.4 |
| Total Olefins | 59.3 |
| Ethylene | 15.6 |
| Propylene | 30.4 |
| Butenes | 13.2 |
| Hydrogen | 6.3 |

Example 4

A catalytic steam cracking experiment was conducted. The process had a configuration similar to FIGURE.

A hydrocarbon feed was introduced to the respective process having a temperature of about 100 deg. C. and a space velocity of about 1 $h^{-1}$. The hydrocarbon feed was a light vacuum gasoil obtained from a vacuum distillation unit. The hydrocarbon feed had a composition as shown in Table 4.

TABLE 4

| API Gravity | 26.45 |
|---|---|
| Density (g/cm$^3$) | 0.895 |
| Distillation Properties (deg. C.) | |
| TBP 0% | 126.4 |
| TBP 5% | 209.8 |
| TBP 10% | 257.6 |
| TBP 20% | 303.4 |
| TBP 30% | 330.1 |
| TBP 40% | 350.9 |
| TBP 50% | 368.7 |
| TBP 60% | 384.6 |
| TBP 70% | 399.8 |
| TBP 80% | 417.1 |
| TBP 90% | 441.3 |
| TBP 95% | 464.2 |
| TBP 100% | 540.3 |

A water feed was introduced to the respective process having a temperature equal to or greater than about 90 deg. C. and a space velocity of about 4 $h^{-1}$.

The catalytic steam cracking was conducted in a fixed bed reactor including the nanoscale zeolite catalyst. The nanoscale zeolite catalyst was an extruded BEA type zeolite with a 40 wt. % alumina binder. The nanoscale zeolite catalyst had a crystal size ranging between about 10 nm and about 300 nm. The reactor was operated at a temperature of about 600 deg. C. and a pressure of about 0.1 MPa for about 4 hours.

The upgraded hydrocarbon product had a composition as shown in Table 5. The conversion rate was about 92%. The C3 to C2 olefin mass ratio was about 4.2. The C3 to C4 olefin mass ratio was about 0.7. The C3+C4 to C2 olefin mass ratio was about 10.

TABLE 5

| Product | Distribution (wt. %) |
|---|---|
| Light Distillates (C5 or higher) | 3.3 |
| Total Olefins | 51 |
| Ethylene | 5 |
| Propylene | 19 |
| Butenes | 27 |
| Hydrogen | 11 |

Example 5

A catalytic steam cracking experiment was conducted. The process had a configuration similar to FIGURE.

A hydrocarbon feed was introduced to the respective process having a temperature of about 100 deg. C. and a space velocity of about 1 $h^{-1}$. The hydrocarbon feed was an atmospheric gasoil obtained from a crude distillation unit. The hydrocarbon feed had a composition as shown in Table 1.

A water feed was introduced to the respective process having a temperature equal to or greater than about 90 deg. C. and a space velocity of about 4 $h^{-1}$.

The catalytic steam cracking was conducted in a fixed bed reactor including the nanoscale zeolite catalyst. The nanoscale zeolite catalyst was a mixture of about 1-10 wt. % ZSM-5 type zeolite and about 90-99 wt. % BEA type zeolite extruded with a 40 wt. % alumina binder. The nanoscale zeolite catalyst had a crystal size ranging between about 10 nm and about 300 nm. The reactor was operated at a temperature of about 600 deg. C. and a pressure of about 0.1 MPa for about 3 hours.

The upgraded hydrocarbon product had a composition as shown in Table 6. The conversion rate was about 90%. The C3 to C2 olefin mass ratio was about 3.3. The C3 to C4 olefin mass ratio was about 0.77. The C3+C4 to C2 olefin mass ratio was about 7.7.

TABLE 6

| Product | Distribution (wt. %) |
|---|---|
| Light Distillates (C5 or higher) | 4 |
| Total Olefins | 53 |
| Ethylene | 6 |
| Propylene | 20 |
| Butenes | 26 |
| Hydrogen | 10 |

Example 6

A catalytic steam cracking experiment was conducted. The process had a configuration similar to FIGURE.

A hydrocarbon feed was introduced to the respective process having a temperature of about 100 deg. C. and a space velocity of about 1 $h^{-1}$. The hydrocarbon feed was an atmospheric gasoil obtained from a crude distillation unit. The hydrocarbon feed had a composition as shown in Table 1.

A water feed was introduced to the respective process having a temperature equal to or greater than about 90 deg. C. and a space velocity of about 4 $h^{-1}$.

The catalytic steam cracking was conducted in a fixed bed reactor including the nanoscale zeolite catalyst. The nanoscale zeolite catalyst was a mixture of about 40-60 wt. % ZSM-5 type zeolite and about 40-60 wt. % BEA type zeolite extruded with a 40 wt. % alumina binder. The nanoscale zeolite catalyst had a crystal size ranging between about 10 nm and about 300 nm. The reactor was operated at a temperature of about 600 deg. C. and a pressure of about 0.1 MPa for about 3 hours.

The upgraded hydrocarbon product had a composition as shown in Table 7. The conversion rate was about 88%. The C3 to C2 olefin mass ratio was about 2.5. The C3 to C4 olefin mass ratio was about 1.2. The C3+C4 to C2 olefin mass ratio was about 4.5.

TABLE 7

| Product | Distribution (wt. %) |
|---|---|
| Light Distillates (C5 or higher) | 5 |
| Total Olefins | 55 |
| Ethylene | 10 |
| Propylene | 24.5 |
| Butenes | 20 |
| Hydrogen | 11 |

Example 7

A catalytic steam cracking experiment was conducted. The process had a configuration similar to FIGURE.

A hydrocarbon feed was introduced to the respective process having a temperature of about 100 deg. C. and a space velocity of about 1 $h^{-1}$. The hydrocarbon feed was an atmospheric gasoil obtained from a crude distillation unit. The hydrocarbon feed had a composition as shown in Table 1.

A water feed was introduced to the respective process having a temperature equal to or greater than about 90 deg. C. and a space velocity of about 4 $h^{-1}$.

The catalytic steam cracking was conducted in a fixed bed reactor including the nanoscale zeolite catalyst. The nanoscale zeolite catalyst was a mixture of about 90-99 wt. % ZSM-5 type zeolite and about 1-10 wt. % BEA type zeolite extruded with a 40 wt. % alumina binder. The nanoscale zeolite catalyst had a crystal size ranging between about 10 nm and about 300 nm. The reactor was operated at a temperature of about 600 deg. C. and a pressure of about 0.1 MPa for about 3 hours.

The upgraded hydrocarbon product had a composition as shown in Table 8. The conversion rate was about 85%. The C3 to C2 olefin mass ratio was about 2.2. The C3 to C4 olefin mass ratio was about 1.9. The C3+C4 to C2 olefin mass ratio was about 3.3.

TABLE 8

| Product | Distribution (wt. %) |
|---|---|
| Light Distillates (C5 or higher) | 6 |
| Total Olefins | 58 |
| Ethylene | 13 |
| Propylene | 28 |
| Butenes | 15 |
| Hydrogen | 8 |

Comparative Example

A non-catalytic steam cracking experiment was conducted. The process had a configuration similar to FIGURE, but in the absence of a catalyst.

A hydrocarbon feed was introduced to the respective process having a temperature of about 100 deg. C. and a space velocity of about 1 $h^{-1}$. The hydrocarbon feed was an atmospheric gasoil obtained from a crude distillation unit. The hydrocarbon feed had TBP 0% of 180 deg. C. and a TBP 100% of 350 deg. C. A water feed was introduced to the respective process having a temperature equal to or greater than about 90 deg. C. and a space velocity of about 4 $h^{-1}$. The non-catalytic steam cracking was conducted in a reactor operated at a temperature of about 600 deg. C. and a pressure of about 0.1 MPa for about 3 hours.

The upgraded hydrocarbon product had a composition as shown in Table 9. The conversion rate was about 22%. The C3 to C2 olefin mass ratio was about 5. The C3 to C4 olefin mass ratio was about 1.2. The C3-C4 to C2 olefin mass ratio was about 9.

TABLE 9

| Product | Distribution (wt. %) |
|---|---|
| Light Distillates (C5 or higher) | 2 |
| Total Olefins | 10 |
| Ethylene | 1 |
| Propylene | 5 |
| Butenes | 4 |
| Hydrogen | 0.1 |
| Other Dry Gas | 9.9 |

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method for producing light olefins from a hydrocarbon feed, the method comprising the steps of:
   introducing the hydrocarbon feed and a water feed to a reactor to produce an effluent stream, wherein the hydrocarbon feed and the water feed are introduced at a water-to-oil mass flow ratio of about 4, wherein the reactor is operated at a temperature and pressure such that cracking reactions occur in the reactor, wherein the reactor includes a catalyst bed consisting essentially of a nanoscale zeolite catalyst having a crystal size ranging between 10 nm and 300 nm, wherein the reactor is operated at a nanoscale zeolite catalyst-to-oil mass ratio at about 0.5 per cracking cycle, wherein the effluent stream comprises the light olefins;
   introducing the effluent stream to a first separator to produce a gas phase fraction and a liquid phase fraction, wherein the gas phase fraction comprises the light olefins; and
   introducing the liquid phase fraction to a second separator to produce a liquid hydrocarbon stream and a spent water stream.

2. The method of claim 1, wherein the hydrocarbon feed is selected from the group consisting of: an atmospheric gasoil, a light vacuum gasoil, and combinations of the same.

3. The method of claim 1, wherein the nanoscale zeolite catalyst is selected from the group consisting of: a BEA type, a ZSM-5 type, and combinations of the same.

4. The method of claim 3, wherein the nanoscale zeolite catalyst is a mixture of 90 to 99 wt. % of the BEA type and 1 to 10 wt. % of the ZSM-5 type, wherein the gas phase fraction has an ethylene content ranging between 3 and 7 wt. % and a butenes content ranging between 23 and 30 wt. %.

5. The method of claim 3, wherein the nanoscale zeolite catalyst is a mixture of 40 to 60 wt. % of the BEA type and 40 to 60 wt. % of the ZSM-5 type, wherein the gas phase fraction has an ethylene content ranging between 8 and 12 wt. % and a butenes content ranging between 16 and 22 wt. %.

6. The method of claim 3, wherein the nanoscale zeolite catalyst is a mixture of 1 to 10 wt. % of the BEA type and 90 to 99 wt. % of the ZSM-5 type, wherein the gas phase fraction has an ethylene content ranging between 13 and 20 wt. % and a butenes content ranging between 10 and 15 wt. %.

7. The method of claim 1, wherein the reactor includes silica carbide positioned above and in contact with the catalyst bed.

8. The method of claim 1, wherein the nanoscale zeolite catalyst is extruded with an alumina binder.

9. The method of claim 8, wherein the alumina binder content of the nanoscale zeolite catalyst ranges between 10 wt. % and 70 wt. %.

10. The method of claim 8, wherein the nanoscale zeolite catalyst has a silica-to-alumina mass ratio ranging between 10 and 200.

11. The method of claim 1, wherein the nanoscale zeolite catalyst has a mesopore-to-micropore volume ratio ranging between 0.5 and 1.5.

12. The method of claim 1, wherein the nanoscale zeolite catalyst has a total acid site concentration ranging between 0.2 mmol/g and 2.5 mmol/g.

13. The method of claim 12, wherein the nanoscale zeolite catalyst has a of BrIInsted acid site concentration ranging between 0.05 mmol/g and 1.0 mmol/g.

14. The method of claim 1, wherein the effluent stream and the gas phase fraction further comprise hydrogen.

15. The method of claim 1, wherein the reactor is operated at a temperature ranging between 590 deg. C. and 650 deg. C.

16. The method of claim 1, wherein the hydrocarbon feed is introduced to the reactor at a space velocity ranging between 0.25 h$^{-1}$ and 5 h$^{-1}$.

17. The method of claim 1, wherein the water feed is introduced to the reactor at a space velocity ranging between 0.5 h$^{-1}$ and 20 h$^{-1}$.

18. The method of claim 1, further comprising the step of:
    regenerating the nanoscale zeolite catalyst, comprising the steps of:
       evacuating internal fluids of the reactor; and
       introducing a regeneration gas to the reactor while maintaining the reactor at a temperature ranging between 650 deg. C. and 750 deg. C.

19. The method of claim 18, wherein the regeneration gas comprises oxygen.

20. The method of claim 18, wherein the regeneration gas is introduced to the reactor for a duration ranging between 15 minutes and 30 minutes.

21. The method of claim 18, wherein the regenerating step is continued until the regeneration gas exiting the reactor has a carbon dioxide content less than 0.05 wt. %.

* * * * *